Feb. 17, 1970    P. A. GLORIOSO    3,496,325
APPARATUS AND CIRCUITRY FOR WELDING STUDS
Filed June 3, 1966    2 Sheets-Sheet 1
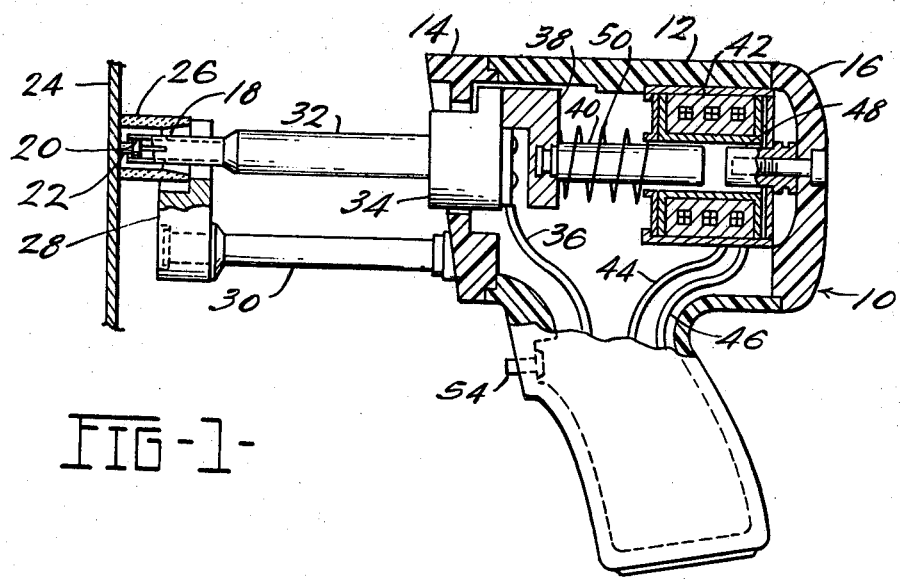
FIG-1-
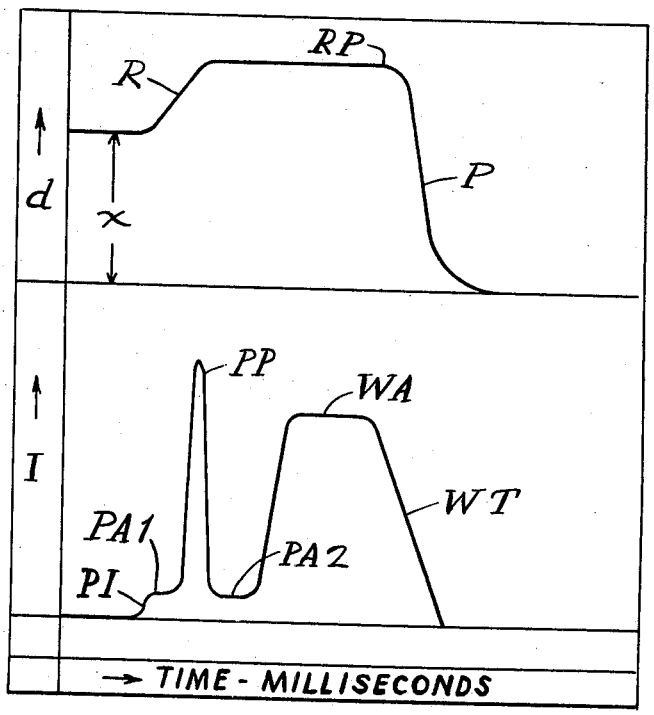
FIG-2-
INVENTOR:
PAUL A. GLORIOSO.
BY
ATT'YS.

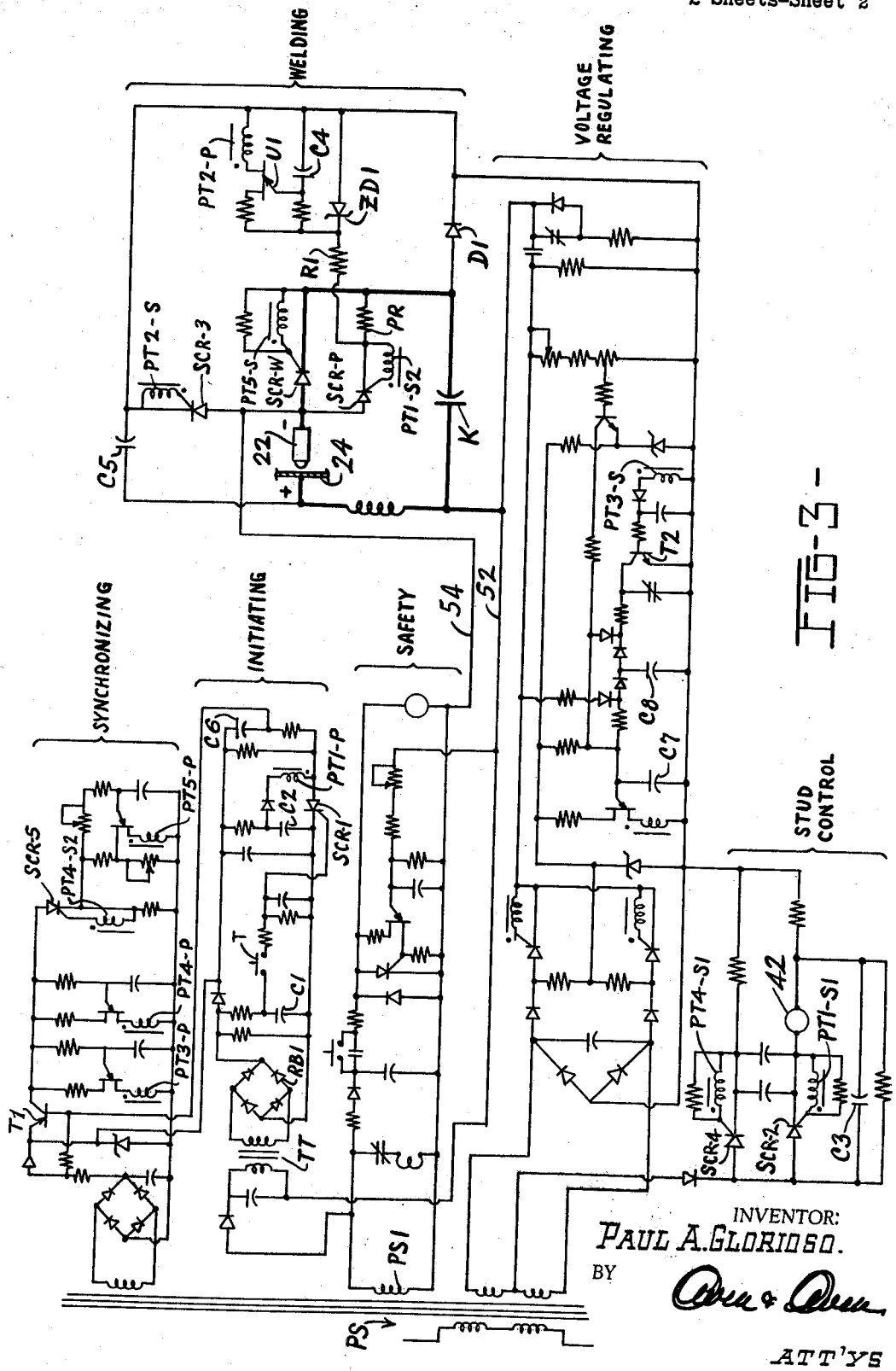

United States Patent Office 3,496,325
Patented Feb. 17, 1970

3,496,325
APPARATUS AND CIRCUITRY FOR WELDING STUDS
Paul A. Glorioso, Amherst, Ohio, assignor, by mesne assignments, to TRW Inc., Cleveland, Ohio, a corporation of Ohio
Filed June 3, 1966, Ser. No. 555,135
Int. Cl. B23k 11/04
U.S. Cl. 219—98          10 Claims

ABSTRACT OF THE DISCLOSURE

A method and apparatus for welding studs to a workpiece includes establishing an initial short, high-intensity arc between the stud and the workpiece prior to establishing a main welding arc therebetween. The high-intensity arc disposes of contaminants on the workpiece without heating the workpiece over a large area. After this arc has decreased substantially in intensity, the main welding arc is then established between the stud and the workpiece with the stud then plunged against the workpiece in the usual manner to complete the weld.

---

This invention relates to a method and apparatus for welding a stud to a workpiece and more particularly for welding a stud to a surface having material thereon which is non-compatible with the welding.

In end welding a stud to a workpiece, the end of the stud to be welded is first place in contact with the portion of the workpiece to which it is to be welded. Power is then supplied to the stud and the workpiece and the stud is retracted from the workpiece substantially at the same time, to a predetermined retracted position. With a potential between the stud and the workpiece, a pilot arc is drawn as the stud is retracted. Usually after the stud reaches the retracted position, more power is applied and a heavy, main welding arc is initiated over the pilot arc for a predetermined period. The stud is then plunged against the workpiece to join the two by virtue of the molten metal formed by the intense main welding arc. Heretofore, the pilot arc initially established between the stud and the workpiece was primarily for the purpose of enabling the main welding arc to be established without the very high potential which would otherwise be required between the stud and workpiece, when spaced apart, to initiate such an arc.

More recently, it has been found that the pilot arc is helpful in penetrating or removing a thin coating or layer of material on the surface of the workpiece or on the stud, which material is non-compatible with the welding and may cause an improper weld to be produced. This can result by the material inhibiting the welding arc or even in preventing such an arc from being initiated at all. The ordinary pilot arc has limited effect on such material; however, by extending the length of the pilot arc to several times that normally employed, the arc has a more pronounced effect on penetrating or removing such materials.

Materials which are non-compatible with the welding can be any of many types which, by their presence, tend to cause a poorer weld to be effected than would otherwise result if the material were not present. Commonly, such material is in the form of dirt, rust, oil or other contaminants on the surface. However, the material also can be a coating which is deliberately applied to the surface, such as by painting or galvanizing. The material also can be water, oil, or the like, particularly if the welding is to take place under the surface of the liquid.

In accordance with the instant invention, it has been discovered that an intense, short arc or pulse can be superimposed on the pilot arc to eliminate the deleterious effects of such materials. Further, the short arc of high intensity in combination with the pilot arc has a number of advantages over the use of an extended pilot arc of the usual low intensity. The short, intense arc does not cause distortion of the surface of the workpiece because of the short duration of the heat resulting from the new arc. This is particularly important when welding studs to thin materials which can otherwise bend or buckle under the influence of an extended pilot arc. In addition, the intense, short arc does not extend the length of the pilot arc nor the overall length of the welding cycle whatsoever, which is particularly important where high welding rates are to be employed. Thirdly, the new arc is more efficient since there is less dissipation of heat with the short, intense arc. This arc also does not heat the overall stud to the extent resulting from an extended pilot arc, so that droplets or berries of molten metal produced when the stud is plunged against the workpiece, known in the art as splatter, does not adhere to the stud, which is relatively cold. When capacitors are used for the welding power, fewer are required than when an extended pilot arc is used, and no additional external power source is required. Further, circuitry for achieving the new arc can, in many instances, be added to existing apparatus in a minimum of time and with substantially no alterations being required to the existing apparatus.

In a preferred form of the invention, a short, intense arc is established between the stud and the workpiece after the conventional, relatively low-powered pilot arc is established. Also, in the preferred form, the short intense arc is terminated prior to the initiation of the main welding arc so that the low-powered pilot arc can persist for a period of time, however short, between the termination of the intense arc and the main welding arc. This provides a stabilized pilot arc which enables a better controlled main welding arc to be established.

It is, therefore, a principal object of the invention to provide a method and apparatus for effecting a weld under adverse conditions.

Another object of the invention is to provide an improved method and apparatus for welding a stud to a workpiece when non-compatible material is on the workpiece.

Yet another object of the invention is to provide a method and apparatus for welding a stud to a workpiece with an improved arc having the advantages enumerated above.

Many other objects and advantages of the invention will be apparent from the following detailed description of a preferred embodiment thereof, reference being made to the accompanying drawing, in which:

FIG. 1 is a view in longitudinal cross section through a conventional welding tool with which the instant invention can be embodied;

FIG. 2 is a graph representing the position of a stud and current flow during a cycle of welding a stud to a workpiece, as with the tool of FIG. 1; and FIG. 3 is a diagram of a circuit for effecting the welding cycle represented in FIG. 2.

Referring to FIG. 1, a stud welding tool with which the invention can be embodied is indicated at 10 and is of conventional design, requiring no additional components to enable practice of the invention. The tool 10 includes a main housing 12 of dielectric material having a front wall 14 and a rear cap 16. A chuck 18 is located at the forward end of the tool and has a slotted recess 20 to receive a stud 22 which is to be welded to a workpiece 24. The stud can be of any suitable type although the invention has been found to be particularly advantageous when employed with the welding of studs by a high intensity, short welding arc as achieved with a capacitive power source. A suitable spark shield 26 can be located around the stud 22. The shield is positioned so that the end of the stud protrudes slightly beyond the shield prior to the end of the stud being pressed against the workpiece to assure that the stud is initially in good contact with the workpiece. The spark shield 26 is supported and positioned by means of a supporting foot 28 which is held in front of the tool by a pair of adjustable legs 30 mounted in the main housing 12. Rather than a permanent spark shield, disposable ferrules can be employed, being held in a similar position by a suitably modified supporting foot, as is well known in the art.

The stud chuck 18 is attached to a chuck leg 32 which is electrically connected by a cable clamp 34 to a main welding cable 36. A rear cable clamp part 38 it attached to the clamp 34 and has a solenoid core 40 affixed thereto. The core 40 moves longitudinally of the tool along with the cable clamp parts 34 and 38, the leg 32, the chuck 18, and the stud 22. The core 40 extends into a lifting and holding coil 42 and is pulled or retracted into the coil when power is supplied through leads 44 and 46. An adjustable stop 48 at the rear of the coil 42 determines the extent to which the core moves into the coil and, hence, the extent to which the stud is retracted from the workpiece during the welding cycle. A return or plunge spring 50 plunges the stud back to the workpiece after a main welding arc has been established therebetween for a period of time, and after the current to the coil 42 is shut off.

The welding cycle in accordance with the invention is graphically shown in FIG. 2. The upper part of this figure represents the distance between the surface of the workpiece and a point on the stud which is a distance X above the tip thereof. The portion of the stud below this point is melted by the welding arc so that the point is at the surface of the workpiece when the weld is completed. When the stud is retracted from the workpiece, the point X moves away, represented by a sloping line R. The stud is then held in a retracted position represented by a substantially straight line RP for a predetermined period of time, after which the stud is plunged toward the workpiece represented by a sharply sloping line P. The stud slows immediately prior to actually contacting the surface of the workpiece because of a greater resistance to the plunging movement due to the molten metal.

Referring now to the current flow represented in the lower part of FIG. 2, substantially at the time the stud begins to retract from the workpiece, power is supplied to the stud and the workpiece to establish the pilot arc as the stud moves away. The initiation of the pilot arc is represented by a sharply sloping line PI, with the pilot arc represented by two substantially horizontal lines PA1 and PA2. After the stud is in the retracted position, and after the pilot arc has been established for a predetermined period, the main welding arc is initiated by being superimposed over the pilot arc, with the main welding arc represented by a higher, substantially horizintal line WA. The welding arc is terminated as the stud is plunged to the workpiece, with the arc decaying and terminating, as represented by a sharply downwardly sloping line WT. Ideally, the welding arc terminates substantially at the time the stud contacts the workpiece so that molten metal formed by the welding arc will not have a chance to solidify prior to the joining of the stud and workpiece. If the stud contacts the workpiece prior to the termination of the welding arc, a brief jump in current may occur at the end of the welding cycle. Also, ideally, the stud will begin to retract at the time the power is supplied for the pilot arc. As a practical matter, however, the pilot arc power is supplied slightly before the retraction of the stud with a brief jump in current occurring after the pilot arc power is supplied and prior to the retraction of the stud. However, these have no effect on the actual welding cycle and the welding performance of the equipment.

To overcome the effect of non-compatible materials on the surface of the workpiece to which the stud is to be welded or on the stud itself, it has heretofore been suggested that the pilot arc, as represented by the line PA1 and PA2, can be extended to several times its normal length. While this apparently overcomes much of the deleterious effect of the material on the workpiece, the extended pilot arc tends to distort the workpiece, particularly if thin, due to the heat which is conducted to other than the immediate portion of the workpiece to which the stud is to be welded. In addition, the extended pilot arc causes the stud to be heated in other than the immediate welding area to such an extent that small globules of molten metal, formed when the stud is plunged against the workpiece, tend to adhere to the stud permanently. This detracts from the appearance of the stud and may also hamper the function thereof if, for example, the stud is threaded. Since much of the heat is conducted away when the extended pilot arc is used, this arc also is of relatively low efficiency. Of course, the extended pilot arc also lengthens the overall time of the welding cycle, which is an important factor when studs are welded at high rates. Further, the use of the extended pilot arc often requires a substantial increase in the source of power, particularly when capacitors are employed for establishing the welding arc.

In accordance with the invention, a short, intense arc or pulse is superimposed on the pilot arc as represented by the line PP. This short, intense arc overcomes the deleterious effects of non-compatible materials on the workpiece without the disadvantages otherwise incurred with extended pilot arcs. The short, intense pulse does not give the heat a chance to dissipate, with the result that the workpiece, even if thin, is not distorted, and the stud itself is not heated to any extent so that molten metal berries will not permanently attach thereto but will either fall off or can be simply knocked off with a suitable blade. The material on the workpiece also is eliminated or at least the deleterious effects thereof are overcome with less power than otherwise required, primarily because less heat is dissipated and more is applied to the pertinent areas. In addition, since the short, intense pulse is superimposed on the pilot arc and is shorter than the pilot arc, absolutely no increase whatsoever in the overall welding time is encountered. When capacitors are used for the main welding current, relatively few additional ones are required to supply the power for the intense pulse.

In the preferred form, the short, intense arc or pulse is established after the pilot arc is established and, in any case, not earlier than the pilot arc. Also, in the preferred form, the pulse is timed to terminate no later than the pilot arc is terminated and preferably somewhat before the pilot arc is terminated. It has been found that if the intense pulse terminates at least one-half millisecond before the pilot arc ends, as determined by the initiation of the main welding arc, a more stable welding arc occurs, apparently because the pilot arc has had a chance to become stable once again after the pulse has terminated. As to intensity, the pulse is preferably at least as intense as or more intense than the main welding arc.

For purposes of illustration, the power for the lifting coil of the welding tool to retract the stud and the power for the pilot arc can be initiated at approximately the same time. The pilot arc is then established for an adjustable period from thirty-five to fifty-seven milliseconds, with the arc actually being initiated from five to ten milliseconds after the power is applied because it requires about this much time for the stud to begin to retract after power is supplied to the lifting coil. The main welding arc is then applied after thirty-five to fifty-seven milliseconds, with this arc being imposed on the pilot arc. The main welding arc will last approximately six to eight milliseconds when capacitors are used as the main welding arc power source. The main welding arc is preferably terminated by the stud contacting the workpiece near the end of the plunge stroke.

The pilot arc can be shorter or longer than specifically set forth and the main welding arc can be shorter, if the welding tool is capable of reacting sufficiently fast to quickly retract and plunge the stud. The main welding arc can also be longer, in the order of several seconds, if a proper power source is employed. The intensity of the pilot arc can be from a few to at least one hundred amperes with the intensity of the welding arc from a few hundred to several thousand amperes.

Under these circumstances, the pulse can be initiated about twenty milliseconds after the initiation of the pilot arc with the pulse lasting two milliseconds. With this timing, the intense pulse is always established after the pilot arc has reached its given intensity and the pulse always terminates prior to the initiation of the main welding arc. In intensity, the intense pulse is preferably higher than that of the main welding arc. With the example above, the pulse preferably reaches an intensity of one thousand to fourteen hundred amperes at its peak.

A specific circuit for carrying out the invention is shown in FIG. 3. Much of this circuitry is shown and described in detail in my co-pending application, Ser. No. 498,802, entitled "Welding Studs to Workpieces" and will not be discussed in detail here. When the stud 22 is in contact with the workpiece 24, an electrical path is completed through lines 52 and 54 to connect a secondary winding PS1 of a main power source PS to a tuned transformer TT. A full wave rectifier bridge RB1 then provides fully rectified current for an initiating portion of the circuitry. When contacts of a trigger T are closed, a capacitor C1 is connected to the gate of and fires or keys a first silicon controlled rectifier SCR1. A capacitor C2 then discharges through a primary PTI-P of a first pulse transformer. This causes a pilot arc to be established between the stud and the workpiece as the stud is retracted from the workpiece. To accomplish this, a second silicon controlled rectifier SCR2 in the stud control portion of the circuitry is in series with the lifting coil 42 and is keyed by a secondary PT1-S1 of the first pulse transformer. A capacitor C3 then discharges partially across the coil 42 and pulls in the core 40 of the tool to retract the stud from the workpiece.

Another secondary winding PT1-S2 of the first pulse transformer is located in the welding portion of the circuitry, specifically in a pilot arc circuit, and is pulsed simultaneously with the first secondary winding. This keys a silicon controlled rectifier SCR-P which establishes a pilot arc circuit between the stud 22 and the workpiece 24 and a main welding capacitor K, which constitutes a primary welding power source. This circuit is established through a pilot arc resistor PR which limits the power for and the intensity of the pilot arc. The pilot arc thereby is initiated as the stud begins to retract.

When power is suppiled for the pilot arc, a voltage drop occurs across the resistor PR. The voltage is applied to a Zener diode ZD1 through a limiting resistor R1. Constant voltage controlled by the Zener diode ZD1 then charges a capacitor C4 until the intrinsic stand-off ratio of a unijunction transistor U1 is reached, at which time the capacitor C4 discharges through a primary PT2-P of a second pulse transformer. A secondary PT2-S of the second pulse transformer then keys a silicon controlled rectifier SCR3 to enable a capacitor C5 to discharge across the stud and workiepce over the pilot arc.

By way of a specific example, the time delay caused by the capacitor C2 and the unijunction transistor U1 in discharging the capacitor C5 can be about twenty milliseconds, when the duration of the pilot arc is about forty-five milliseconds. The capacitor C5 is connected directly across the stud and the workpiece without any resistance or inductance in the circuit so that the duration of the short, intense arc caused by the capacitor C5 is only about two milliseconds. Consequently, after the intense arc has terminated, the pilot arc continues for about twenty-three milliseconds until the main welding arc is initiated.

When the rectifier SCR1 is keyed, a transistor T1 in the synchronizing portion of the circuit is turned on or enregized after a time delay determined by a capacitor C6. A primary PT3-P of a third pulse transformer is subsequently pulsed to cause the voltage regulating portion of the circuitry to be isolated from the capacitors K and C5 through a secondary PT3-S in the voltage regulating circuitry. The secondary energizes a second transistor T2 which discharges capacitors C7 and C8 for this purpose.

With the voltage regulation portion of the circuitry isolated from the capacitors, a primary PT4-P of a fourth pulse transformer in the synchronizing circuit is pulsed. This pulse transformer has a secondary PT4-S1 in the stud control portion of the circuitry which keys a silicon controlled rectifier SCR4, causing the rectifier SCR2 to turn off. This de-energizes the welding tool coil 42 and enables the stud to begin to plunge toward the workpiece under the influence of the plunge spring 50. A secondary winding PT4-S2 in the synchronizing circuit keys another silicon controlled rectifier SCR5 and causes a primary PT5-P of a fifth pulse transformer to be pulsed after a predetermined period. This transformer has a secondary PT5-S in the main welding circuit which keys a silicon controlled rectifier SCR-W and causes the main welding arc to be intiated across the stud and the workpiece by the capacitor K. When the capacitor K is discharged and the stud has contacted the workpiece, the welding cycle is completed. A diode D1 prevents the capacitor K from discharging at the same time capacitor C5 is discharged.

It is to be understood that the above described circuitry is only illustrative of the invention and is illustrated to show a complete embodiment of the invention and the manner in which the portion of the circuitry effecting the short, intense arc on the pilot arc can be incorporated into existing apparatus with little modification. The only change required in the existing welding circuit is a break in the appropriate conductor to install the diode D1.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. Apparatus for welding a stud to a workpiece comprising means for holding the stud in an on-end position with the end of the stud in contact with the workpiece, means for supplying power to the stud and the workpiece, means for retracting the stud from the workpiece to establish a pilot arc therebetween, means for establishing a short, intense arc on the pilot arc, means for establishing a main welding arc between the stud and the workpiece, and means for plunging the stud toward the workpiece.

2. Apparatus according to claim 1 characterized by the intensity of said arc intense being at least as high as that of the main welding arc.

3. Apparatus according to claim 1 characterized by said intense arc-establishing means establishes said intense arc a period of time after said pilot arc is established.

4. Apparatus according to claim 1 characterized by said main arc-establishing means establishes said main arc a period of time after said intense arc is terminated.

5. Apparatus for welding a stud to a workpiece by drawn-arc welding, said apparatus comprising means for holding the stud in an on-end position with the end of the stud in contact with the workpiece, a first source of power, means for retracting the stud from the workpiece, means connecting said source of power between the stud and the workpiece as the stud is retracted for establishing an arc of high intensity at least substantially equal to the intensity of a main welding arc to be subsequently established between the stud and the workpiece, means for establishing the main welding arc between the stud and the workpiece while the stud remains retracted from the workpiece and after the intensity of the intense arc has dropped substantially below the maximum intensity of the main welding arc, and means for plunging the stud toward the workpiece to weld the stud thereto.

6. Apparatus according to claim 5 characterized by said means for establishing said intense arc including a capacitor connected across the stud and the workpiece, switch means in series with said capacitor, and timing means for actuating said switch means to establish the intense arc as the stud is retracted from the workpiece.

7. Apparatus for welding a stud to a workpiece comprising means for holding the stud in an on-end position with the end of the stud in contact with the workpiece, means for supplying power to the stud and the workpiece, means for retracting the stud from the workpiece to establish a pilot arc therebetween for a period from about 35 to about 57 milliseconds, means for establishing a short, intense arc on the pilot arc, means for establishing a main welding arc between the stud and the workpiece for a period of time, said short, intense arc lasting for a fraction of the length of the main welding arc, and means for plunging the stud toward the workpiece.

8. Apparatus according to claim 7 characterized by said means for establishing the main welding arc causes said main welding arc to be established after said short, intense arc is terminated.

9. Apparatus for welding a stud to a workpiece by drawn-arc welding, said apparatus comprising means for holding the stud with an end of the stud in contact with the workpiece, means for retracting the stud from the workpiece, means for supplying power to the stud and the workpiece to establish a pilot arc therebetween as the stud is retracted, means for establishing a short, intense arc on the pilot arc when the stud is retracted, with the short, intense arc being more intense and substantially shorter in duration than the main welding arc to be subsequently established between the stud and the workpiece, means for establishing the main welding arc between the stud and the workpiece after the intensity of the intense arc has dropped substantially below the maximum intensity of the main welding arc, and means for plunging the stud toward the workpiece to weld the stud thereto.

10. Apparatus according to claim 9 characterized by said means for establishing said short, intense arc includes a capacitor connected across the stud and the workpiece, and switch means in series with said capacitor.

References Cited

UNITED STATES PATENTS

| | | | |
|---|---|---|---|
| 2,648,748 | 8/1953 | Sayer | 219—98 |
| 3,176,112 | 3/1965 | Stokes | 219—98 |
| 3,260,890 | 7/1966 | Normando et al. | 219—131 |
| 3,414,701 | 12/1968 | Guettel | 219—98 |

JOSEPH V. TRUHE, Primary Examiner

D. F. DUGGAN, Assistant Examiner

U.S. Cl. X.R.

219—99, 131